United States Patent [19]

Reitmeier

[11] Patent Number: 4,470,065

[45] Date of Patent: Sep. 4, 1984

[54] ADAPTIVE ERROR CONCEALMENT USING HORIZONTAL INFORMATION DETERMINATION FROM ADJACENT LINES

[75] Inventor: Glenn A. Reitmeier, Trenton, N.J.

[73] Assignee: RCA Corporation, New York, N.Y.

[21] Appl. No.: 361,800

[22] Filed: Mar. 25, 1982

[51] Int. Cl.³ .................. H04N 9/491; H04N 5/78
[52] U.S. Cl. .................. 358/21 R; 358/163; 358/314; 358/336; 358/327; 360/38.1
[58] Field of Search ............. 358/21 R, 37, 163, 166, 358/314, 336, 315, 327; 360/38; 371/31, 65

[56] References Cited

U.S. PATENT DOCUMENTS

| | | | |
|---|---|---|---|
| 4,122,489 | 10/1978 | Bolger | 358/21 R |
| 4,368,483 | 1/1983 | Liu | 358/314 |
| 4,376,289 | 3/1983 | Reitmeier | 358/163 |
| 4,376,955 | 3/1983 | Reitmeier | 358/314 |
| 4,377,820 | 3/1983 | Reitmeier | 358/21 R |
| 4,381,519 | 4/1983 | Wilkinson | 358/21 R |

Primary Examiner—Tommy P. Chin
Attorney, Agent, or Firm—E. M. Whitacre; H. I. Steckler; L. C. Edelman

[57] ABSTRACT

An adaptive error concealment system uses either a horizontal or vertical average as a replacement pixel for an erroneous pixel. The choice is dependent upon the amount of horizontal information in at least one adjacent horizontal line. This avoids errors if certain horizontal or vertical stripe patterns are present in the video signal.

9 Claims, 6 Drawing Figures $$v_T(n-1) \quad v_T(n) \quad v_T(n+1)$$
$$O \qquad O \qquad O$$

$$v_M(n-1) \quad v_M(n) \quad v_M(n+1)$$
$$O \qquad X \qquad O$$

$$O \qquad O \qquad O$$
$$v_B(n-1) \quad v_B(n) \quad v_B(n+1)$$

O ─(WHITE)

(BLACK)─O    X    O─(BLACK)

O─(WHITE)

ADAPTIVE ERROR CONCEALMENT USING HORIZONTAL INFORMATION DETERMINATION FROM ADJACENT LINES

BACKGROUND OF THE INVENTION

The present invention relates to adaptive error concealment, and more particularly, to such concealment that uses information from adjacent lines to determine the method of concealment.

Prior U.S. application Ser. No. 241,925, filed Mar. 9, 1981, entitled "Interleaved Recording Format For digital Video", and assigned to the assignee of the present invention, now U.S. Pat. No. 4,393,414, describes a method of formatting component video data on tape so that a dropout affects every other pixel on a given television line, and if a dropout is of long duration, it affects pixels on an interleaved basis on adjacent TV lines. FIG. 1 shows such an error pattern for a dropout of at least three lines duration, after the original sequential order of the pixels is restored, and wherein X and O respectively denote erroroneous and correct pixels. This format arrangement is ideal for a two-track DVTR (Digital Video Tape Recorder) since it is easily implementable; however, the error pattern of every other sample in error imposes a difficult situation for error concealment. One approach to concealing an erroneous pixel would be to average the four correct pixels (that is, top, bottom, left and right) surrounding the good pixel. Consider the data shown in FIG. 2, which shows an error pattern for either a long or short (less than one line) dropout. Here the pixels above and below the erroneous pixel are white, while the pixels to the left and right are black. This pattern could occur from a single horizontal black line on a white field, in which case the correct value for the erroneous pixel is black, or from vertical black and white stripes having a high frequency, in which case the correct value for the erroneous pixel is white. Averaging the four pixels provides a replacement pixel that is grey, which is not a good replacement value in either case.

Adaptive techniques based on a minimum difference criterion have been described in prior U.S. application Ser. No. 170,811, filed July 21, 1980, entitled "Two-Dimensional Adaptive Dropout Compensator and Chroma Inverter", now U.S. Pat. No. 4,376,955, and assigned to the assignee of the present application. In such a technique the amount of change (difference) of the video signal in at least two directions is computed, and averaging to produce a replacement pixel is done in the direction having the least amount of change. However, in the case of high resolution component video, these techniques also run into difficulty. Consider the previous example shown in FIG. 2. The pixels above and below are both white, and thus the vertical difference is zero. The left and right pixels are both black, and thus the horizontal difference is also zero. Thus, in this case, minimum differencing provides no information for selecting which average (horizontal or vertical) to use as the replacement pixel, and the wrong average may be selected.

It is therefore desirable to provide a more accurate error concealment system.

SUMMARY OF THE INVENTION

Method and apparatus for concealing errors in a sampled video signal, comprising determining the amount of information in a selected direction from samples proximate an erroneous sample, and providing a replacement sample for said erroneous sample by averaging in said selected direction if the information in said selected direction is less than a selected amount and averaging in another direction if said information is greater than said selected amount.

DESCRIPTION OF THE DRAWINGS

FIG. 1 is an error pattern produced by a long duration dropout;

FIG. 2 is an error pattern produced by either of two particular pictures;

FIG. 3 is an error pattern produced by a short duration dropout;

DETAILED DESCRIPTION

This invention overcomes the above-described problems and provides adaptive error concealment of high quality for dropouts affecting less than one video line. When the dropout affects less than one line, the error pattern of FIG. 3 results. Note that the surrounding pixels have been labeled with (n) denoting the erroneous pixel and pixels vertically aligned therewith, and that (n+1) and (n−1) denote pixels in columns immediately adjacent to the right and left respectively of the erroneous pixel. The subscripts T, M and B denote top, middle and bottom line respectively. The values (amplitudes) in digital form of pixels $v_T(n-1)$ and $v_T(n+1)$ are averaged, and compared with the value of pixel $v_T(n)$. Similarly, the values of pixels $v_B(n-1)$ and $v_B(n+1)$ are averaged and compared with the value of pixel $v_B(n)$. If the average of $v_T(n-1)$ and $v_T(n+1)$ is close to $v_T(n)$, then no sharp horizontal transitions occur on the top line, and if the average of $v_B(n-1)$ and $v_B(n+1)$ is close to $v_B(n)$, then no sharp horizontal transitions occur on the bottom line. Thus, a decision for adaptive concealment may be based on the more complete information available on adjacent scan lines. To again consider the example of a black horizontal line, using this method the top and bottom averages will be the same as the pixels $v_T(n)$ and $v_B(n)$ respectively, so the picture information is not in the horizontal direction, and the average of $v_M(n-1)$ and $v_M(n+1)$ may be used as a replacement pixel for $v_M(n)$. In the case of high frequency black and white vertical bars, the top and bottom averages will not agree with the pixels $v_T(n)$ and $v_B(n)$ respectively, so the picture information is in the horizontal direction, and the vertical average of $v_T(n)$ and $v_B(n)$ may be used as a replacement pixel.

Figure 4:
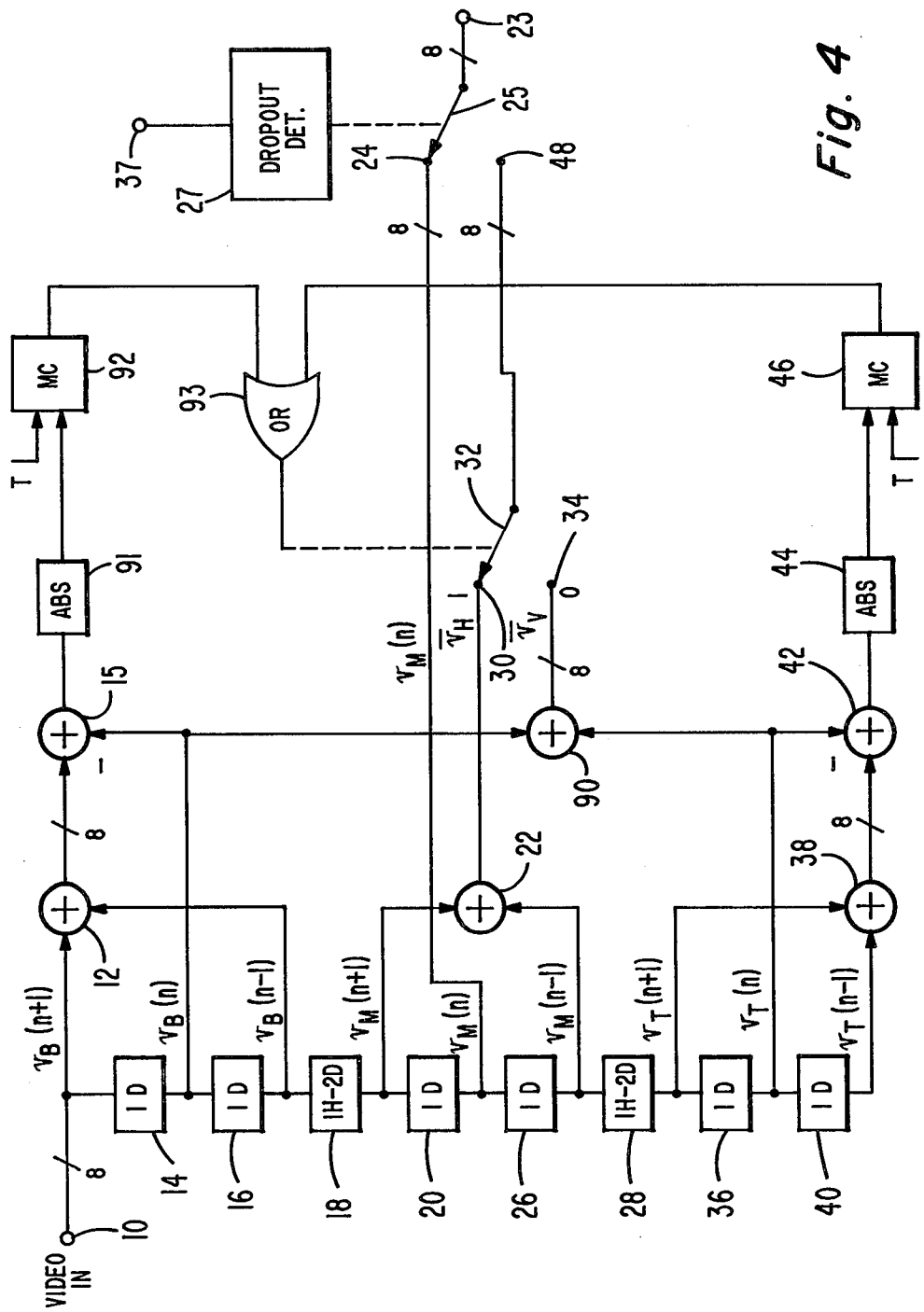
FIG. 4 is a block diagram of an error concealment system in accordance with a first embodiment of the invention.

FIG. 4 shows a block diagram of a system to implement the above described concept. Eight-bit input terminal 10 (8 input terminals, one for each bit) receives an 8-bit digital television signal from a transmission channel, such as a DVTR. If the television signal is recorded with other than eight bits, then the input terminal 10, as well as the remaining 8-bit components of the system (described below), would have the corresponding number of bits; however eight bits is the proposed standard number of bits for television signals. The input signal corresponds to the $v_B(n+1)$ pixel of FIG. 3 and is applied to an 8-bit adder 12 and to 8-bit delay line 14, which delays the signal by the time interval between consecutive sampling times (the reciprocal of the sampling frequency) called "D". The output signal from delay line 14 comprises the $v_B(n)$ pixel and is applied to the subtracting input of 8-bit adder 15, to adder 90, and also to 8-bit delay line 16, which has a delay of one sampling time. The output signal from delay line 16 comprises the $v_B(n-1)$ signal and is applied to adder 12, as well as to 8-bit delay line 18.

Adder 12 averages its input signals to form a bottom estimate of $v_B(n)$ by adding them and dividing by two, the latter being accomplished using a hard-wired right shift of its output bits. The output signal of adder 12 is applied to 8-bit adder 15. The output signal from adder 15 represents the difference between the horizontal estimate and the actual sample value, and it is applied to absolute value circuit 91. The resulting absolute value signal is applied to magnitude comparator 92 for comparison with a threshold signal T. If the accuracy of the horizontal estimate is less than T, comparator provides a ONE signal to OR gate 93.

Delay line 18 has a delay of one horizontal line time minus two sampling times, called "1H-2D", and thus its output signal comprises $v_M(n+1)$. This output signal is applied to 8-bit delay line 20 and to 8-bit adder 22. Delay line 20 has a delay of one sampling time, and thus its output signal comprises $v_M(n)$, which signal is applied to 8-bit input terminal 24 of 8-bit (8PDT) switch 25 and to 8-bit delay line 26. Delay line 26 has a delay of one sampling time, and thus its output signal comprises $v_M(n-1)$, which signal is applied to 8-bit delay line 28 and to adder 22. The output signal from adder 22 is divided by two by shifting and comprises the middle line horizontal average $\bar{v}_H$, which signal is applied to 8-bit input terminal 30 of 8-bit, e.g. 8-pole, switch 32.

Delay line 28 has a time delay of one horizontal line time minus two sampling times, and thus its output signal comprises $v_T(n+1)$, which signal is applied to 8-bit delay line 36 and 8-bit adder 38. Delay line 36 has a delay of one sampling time, and thus its output signal comprises $v_T(n)$, which signal is applied to delay line 40, the subtracting input of 8-bit adder 42, and also to adder 90. Adder 90 averages the signals $v_T(n)$ and $v_B(n)$ to produce a vertical average signal $\bar{v}_V$ that is applied to 8-bit input terminal 34 of switch 32. Delay line 40 has a time delay of one sample time, and thus its output signal comprises $v_T(n-1)$, which signal is applied to adder 38. The output signal from adder 38 comprises the average of signals $v_T(n-1)$ and $v_T(n+1)$, and therefore is an estimate of $v_T(n)$. The actual signal $v_T(n)$ is subtracted from this average by adder 42 to provide an output signal that indicates the accuracy of the horizontal estimate in the top line. This signal is applied to absolute value circuit 44, and the resulting absolute value signal is applied to magnitude comparator 46, where it is compared with threshold signal of value T. If the absolute value signal is less than signal T, i.e. if the top average is close to $v_T(n)$, a ONE signal is provided to OR gate 93.

Gate 93 provides a ONE output signal if either the top or bottom line contains little high frequency horizontal information to switch 32 to control it to contact input 30. Thus the middle line horizontal average signal $\bar{v}_H$ is applied to 8-bit input terminal 48. If neither the top nor the bottom lines have little horizontal information, i.e. both have significant amounts of horizontal information, then gate 93 provides a ZERO output signal, and switch 32 contacts input terminal 34, and thus the vertical average signal $\bar{v}_V$ is applied to input terminal 48 of switch 25. It will be seen that the average time delays of signals $\bar{v}_V$ or $\bar{v}_H$ equals that of $v_M(n)$, which is necessary for the first two signals to serve as a replacement for the latter. Selection between the signals at input terminals 24 and 48 is done by switch 25 under the control of dropout detector 27, such detectors being known in the art. Detector 27 receives at input terminal 37 the reproduced signal, delays it by 1H+1D (the average delay of $v_M(n)$) and provides an error signal to cause switch 25 to contact input terminal 48 when a dropout occurs. Otherwise switch 25 engages input 24. The valid or concealed video signal, as the case may be, is provided at 8-bit output terminal 23.

It will be appreciated that OR gate 93 used herebefore for the switch 32 control may be replaced with a different logic function (such as an AND), and also that only the information from a single adjacent scan line might be used to select a direction of averaging.

The system shown in FIG. 4 is for a monochrome signal, or a signal channel, e.g. Y, I, or Q, of a color video system. The same technique of comparing horizontal estimates to actual pixels on adjacent lines, and using that comparison to control the direction of averaging to be used as a replacement for an erroneous pixel on the current line, can also be applied to composite video. For composite video applications more than two pixels may be averaged in each case, and the pixels that are averaged and the method of averaging must have a relationship that accounts for the proper subcarrier phase.

A complete color component system using the invention could comprise three systems as shown in FIG. 4, one for each of the channels Y, I and Q. However, in a so called "4:2:2" digital video system, wherein the ratio numerals indicate the ratio of the sampling frequencies for each component, the chroma channels are interleaved and may share a single set of hardware which runs at the luminance rate of "4", and only a minor change in the delay line taps is required for this implementation. However, two full systems substantially as shown in FIG. 4 are still required.

Figure 5:
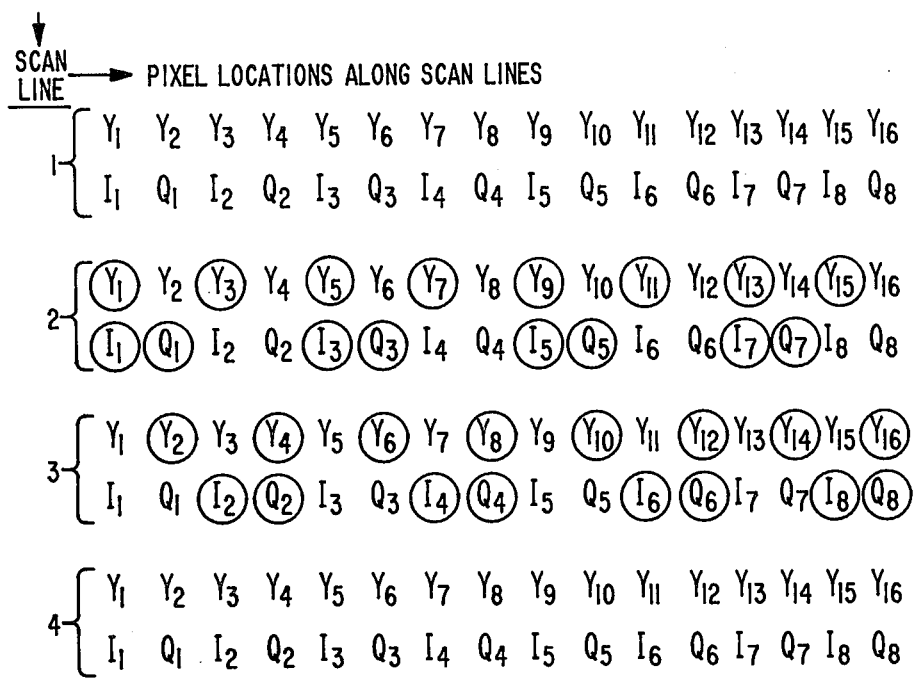
FIG. 5 is an error pattern for a color video signal.

FIG. 5 shows pixel locations during the first four scan lines of a television raster. If the television signal is recorded using a system such as shown in U.S. patent application Ser. No. 241,925 filed Mar. 9, 1981, and assigned to the assignee of the present application, then originally horizontally adjacent pixels are no longer adjacent on the tape. Therefore a burst-type dropout affects non-adjacent pixels when the pixels are rearranged into their original order after playback. This can be seen in FIG. 5 wherein erroneous pixels are circled. Thus on line 2, which contains dropouts, pixels $Y_1$ and $I_1$ are to be concealed simultaneously, as are pixels $Y_5$ and $I_3$, etc. When $Y_3$, $Y_7$, $Y_{11}$ etc. are to be concealed, the chroma channel has valid data and no concealment is required in chroma. When $Q_1$, $Q_3$, $Q_5$ etc. are to be concealed, the luminance channel has valid data, and no concealment is required in luminance. Note also in FIG. 5 that a horizontally adjacent pixel in the original picture of one particular chroma component occurs two pixels away, e.g. $I_2$ is two pixels away from $I_1$.

Figure 6:
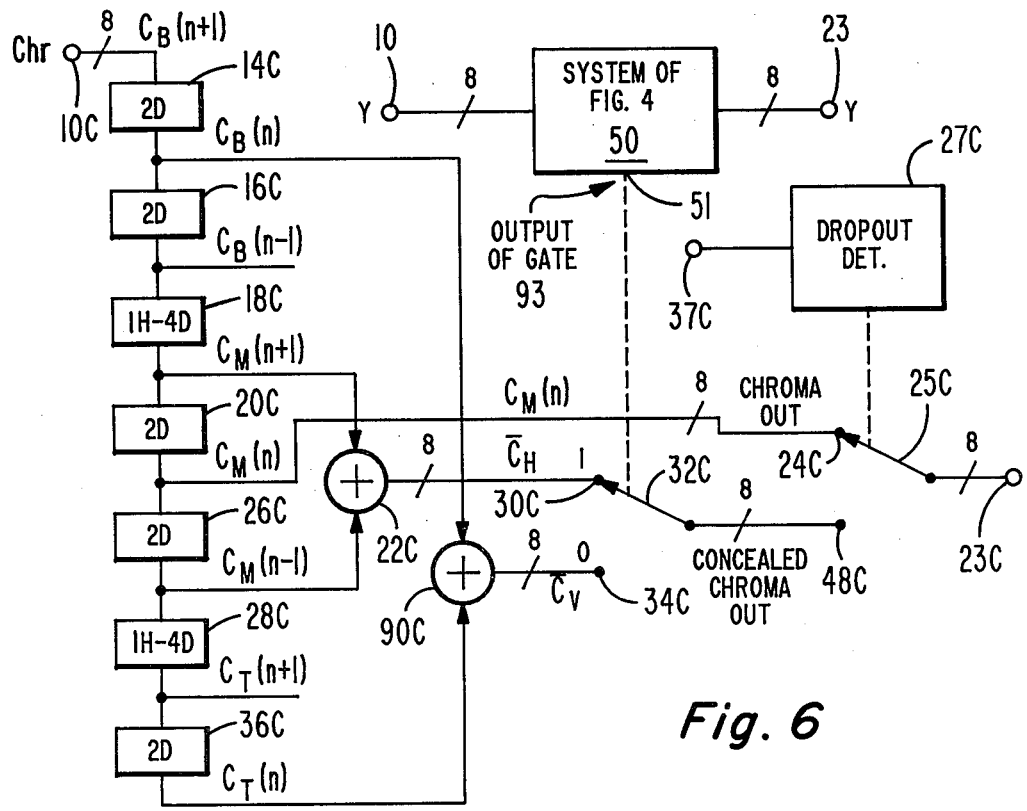
FIG. 6 is a block diagram of an error concealment system in accordance with a second embodiment of the invention.

FIG. 6 shows a block diagram of a system for implementing dropout correction with a recording format as shown in said last recited prior application. Box 50 is identical to the system of FIG. 4 and thus has been given corresponding reference numbers on the input and output terminals. Input terminal 10 receives the luminance signal, and output terminal 23 provides the correct or concealed erroneous Y signal as the case may be. Output 51 provides the output signal from OR gate 93 of FIG. 4 to control 8-bit switch 32C as described below since it is assumed that the direction of resolution in the chroma channel is the same as that of the luminance channel.

The remaining portion of FIG. 6 shows circuitry for dropout concealment of the chroma components. Components of the chroma channel have been given reference numerals corresponding to those of FIG. 4 with a "C" suffix added. Input terminal 10C receives the chroma components and applies them to 8-bit delay lines 14C, 16C, 18C, 20C, 26C, 28C, and 36C, which have respective time delays of two sampling times, two sampling times, one horizontal line time minus four sampling times, two sampling times, two sampling times, one horizontal line time minus four sampling times, and two sampling times. It will be noted that the one and two sampling delays of the delay lines in FIG. 4 are now two and four sampling time delays due to said two pixels distance of adjacent pixels of the same component, and that no delay line corresponding to delay line 40 is needed in the chroma channel portion of FIG. 6. The delay lines of FIG. 6 produce chroma output signals that correspond to those shown in FIG. 4. Thus, 8-bit adder 22C provides the horizontal average chroma signal $\overline{C}_H$ to terminal 30C of switch 32C, 8-bit adder 90C provides the vertical average chroma signal $\overline{C}_V$ to input terminal 30C, and delay line 20C provides the center pixel $C_M(n)$ to contact 24C of switch 25C. Switch 32C is controlled by gate 93 of system 50. Thus 4 adders, 2 absolute value circuits, 2 magnitude comparators, and an OR gate have been eliminated from the chroma channel. The final selection of actual or concealed pixels is performed by 8-bit switch 25C under the the control of dropout detector 27C that receives the reproduced chroma signal at input terminal 37C. Dropout detector 27C operates independently of detector 27, since e.g. on line 2 $Y_3$ must be concealed but not $I_2$.

The embodiment of FIG. 4 has been shown for purposes of clarity. However, since a bottom line becomes a top line two lines later, the calculation of the horizontal resolution is unnecessarily performed twice in FIG. 4. It is therefore possible to eliminate delay line 40, adders 38 and 42, absolute value circuit 44, and comparator 46. In this case, the top line horizontal resolution signal can be derived from comparator 92 by using a 2H delay line (not shown) to provide the lower (as viewed in FIG. 4) input signal to gate 93. The upper input signal to gate 93 is derived directly from comparator 92 as is shown in FIG. 4.

What is claimed is:

1. A method for conealing errors in a sampled video signal, said method comprising determing the relative change in sample amplitude from samples aligned in a selected direction proximate an erroneous sample, and providing a replacement sample for said erroneous sample by averaging the amplitude of samples proximate said erroneous sample aligned in said selected direction if said relative amplitude change in said selected direction is less than a predetermined threshold level and averaging the amplitude of samples proximate said erroneous sample aligned in another direction if said relative amplitude change is greater than said predetermined threshold level.

2. A method as claimed in claim 1, wherein said selected direction comprises the line scan direction of said sampled video signal and said another direction is perpendicular to the line scan direction.

3. Apparatus for concealing errors in a first sampled video signal, said apparatus comprising determining means for determining the relative change in sample amplitude from samples aligned in a selected direction proximate an erroneous sample, and providing means for providing a replacement sample for said erroneous sample by averaging the amplitude of samples proximate said erroneous sample aligned in said selected direction if said relative amplitude change in said direction is less than a predetermined threshold level and averaging the amplitude of samples proximate said erroneous sample aligned in another direction if said relative amplitude change is greater than said predetermined threshold level.

4. Apparatus as claimed in claim 3, wherein said sampled video signal comprises a digital video signal.

5. Apparatus as claimed in claim 3, wherein said determining means comprises a plurality of serially coupled delay ines, one of said delay lines receiving said sampled video signal; an adder having inputs coupled to said delay lines, and having an output; a subtractor having inputs coupled to one of said delay lines and to said adder output respectively and having an output; an absolute value circuit having an input coupled to said subtractor output, and having an output; and a magnitude comparator having an input coupled to said absolute value circuit output.

6. Apparatus as claimed in claim 3, wherein said selected direction comprises the line scan direction of said sampled video signal and said another direction is perpendicular to the line scan direction.

7. Apparatus as claimed in claim 3, wherein said providing means comprises an OR gate having an input coupled to said determining means and having an output; and a switch having a control input coupled to said gate output, and a pair of adders coupled to a pair of inputs, respectively, of said switch.

8. Apparatus as claimed in claim 3, further comprising second providing means for providing a replacement sample for an erroneous sample of a second sampled video signal by averaging the amplitude of samples proximate said erroneous sample aligned in said selected direction if the relative amplitude change of said first signal in said direction is less than a predetermined threshold level and averaging the amplitude of samples proximate said erroneous sample of said second signal in another direction if said relative amplitude change is greater than said predetermined threshold level.

9. Apparatus as claimed in claim 8 wherein said first and second sampled video signals comprises luminance and chrominance components of a digital video signal.

* * * * *

UNITED STATES PATENT AND TRADEMARK OFFICE
CERTIFICATE OF CORRECTION

PATENT NO.   : 4,470,065
DATED        : September 4, 1984
INVENTOR(S)  : GLENN A. REITMEIER It is certified that error appears in the above-identified patent and that said Letters Patent is hereby corrected as shown below:

Column 6, line 28, "ines" should be -- lines --

Column 6, line 54, after "said" insert -- selected --

Signed and Sealed this

Twenty-first Day of May 1985

[SEAL]

*Attest:*

DONALD J. QUIGG

*Attesting Officer*   *Acting Commissioner of Patents and Trademarks*